Figure 1:
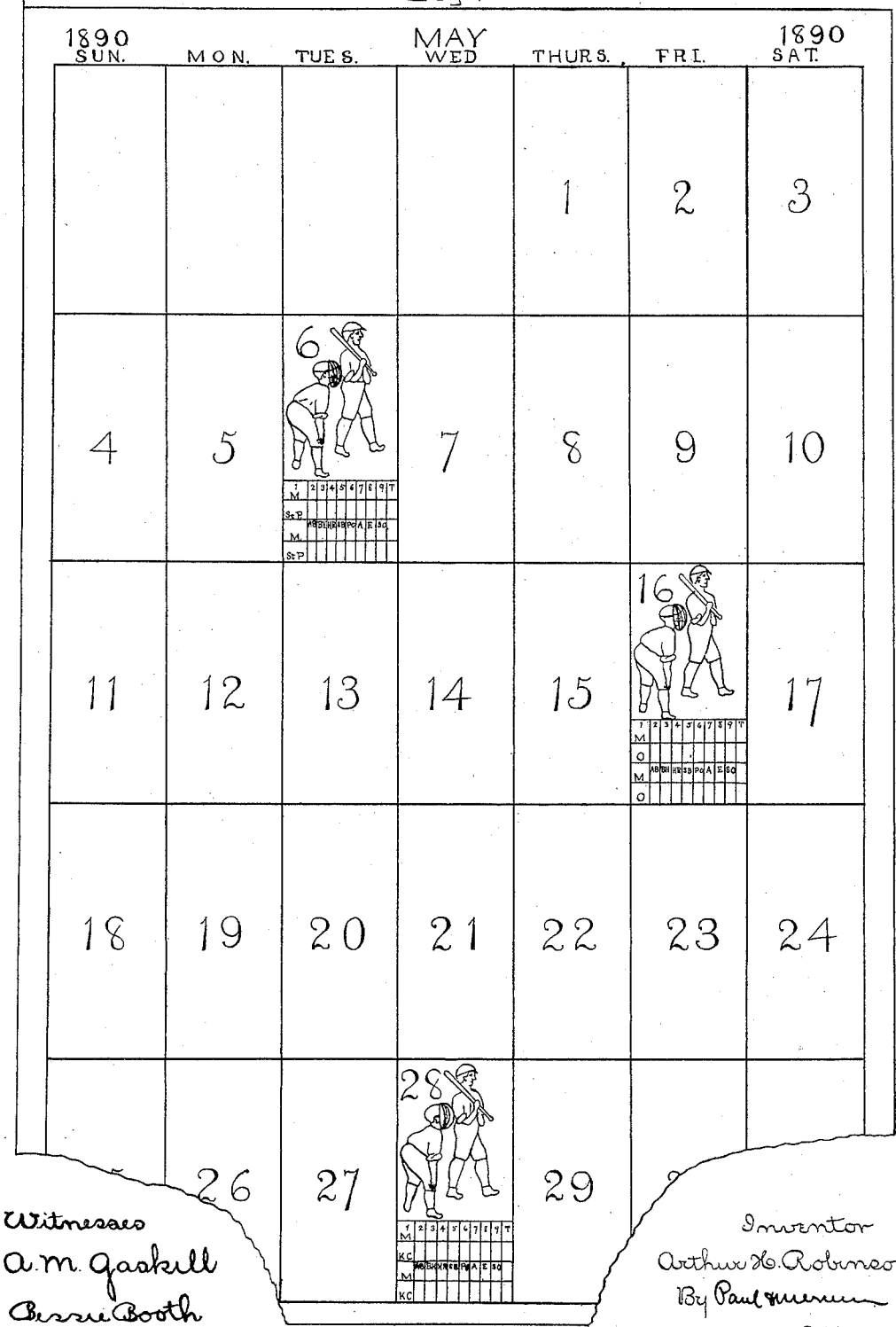

(No Model.)  2 Sheets—Sheet 1.

A. H. ROBINSON.
SPORTING CALENDAR.

No. 432,838. Patented July 22, 1890.

Witnesses
a. m. Gaskell
Bessie Booth

Inventor
Arthur H. Robinson
By Paul &c.
Attys.

(No Model.) 2 Sheets—Sheet 2.
A. H. ROBINSON.
SPORTING CALENDAR.
No. 432,838. Patented July 22, 1890.
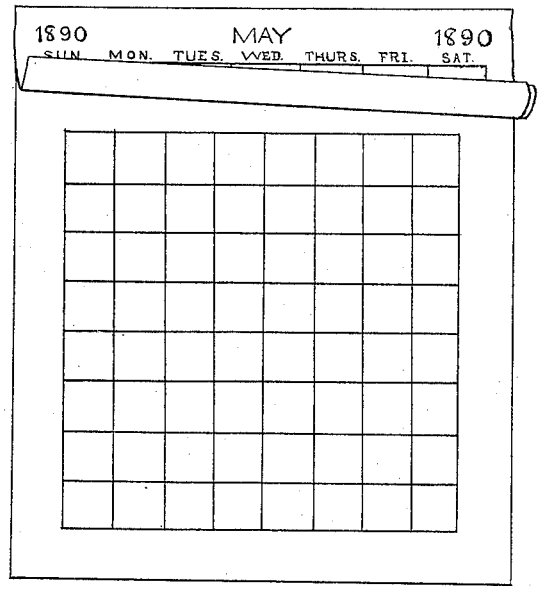
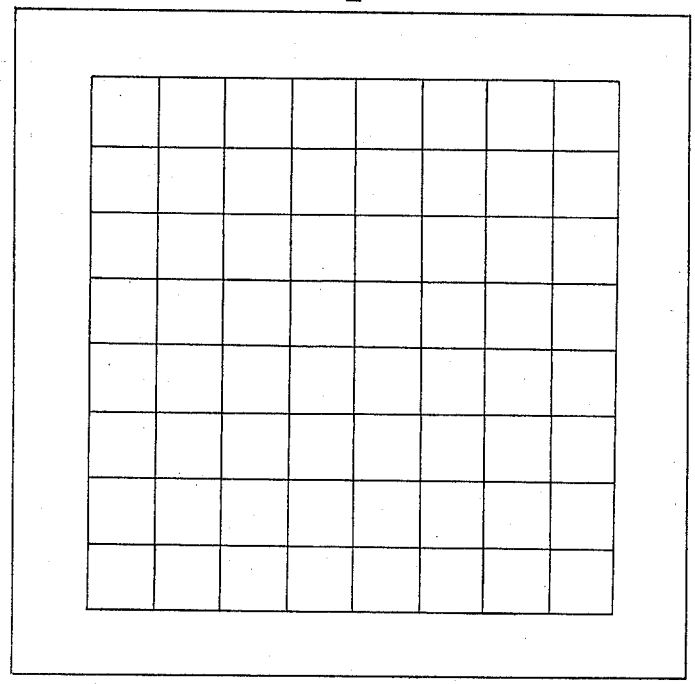

UNITED STATES PATENT OFFICE.

ARTHUR H. ROBINSON, OF MINNEAPOLIS, MINNESOTA.

SPORTING-CALENDAR.

SPECIFICATION forming part of Letters Patent No. 432,838, dated July 22, 1890.

Application filed April 1, 1890. Serial No. 346,190. (No model.)

*To all whom it may concern:*

Be it known that I, ARTHUR H. ROBINSON, of Minneapolis, in the county of Hennepin and State of Minnesota, have invented certain Improvements in Sporting-Calendars, of which the following is a specification.

My invention relates to an improved calendar, and the object I have in view is to provide a device of this class in which sporting events are designated upon the day and date at which they will occur by means of a pictorial design representing such event. I also provide in connection with the design a record-blank, which may be filled out and the result of the sport preserved. I also provide a tabulated sheet in connection with my improvements for a recapitulation of the record.

Other features of my invention will appear from the following description, in which—

Figure 1 represents a face view of my improved calendar. Fig. 2 is a view showing the pages of the calendar raised and the recapitulation-card in view. Fig. 3 represents, on an enlarged scale, the recapitulation-sheet used for the classification of the records.

In the drawings, the calendar is shown divided into spaces in the ordinary way, representing the days of the month. Any sporting event which may occur on any day of a month may be designated by a pictorial representation, readily conveying to the eye what such sport is to be. As shown in the drawings, a figure at the bat and another in the attitude of catcher will at once denote that base-ball is the game or sport represented, and this representation placed upon the spaces or divisions denoting the sixth, sixteenth, and twenty-eighth days of the month signifies that a game or sport of that description will take place upon each of the respective dates. Any other sport—as cricket, polo, horse-racing, boat-racing, &c.—may be represented by picture or design embodying some prominent features of the sport, and any of these designs produced upon the calendar upon the date on which they are to occur will bring constantly before the mind of the person interested in such games the dates upon which the particular sport will transpire.

In the space occupied by the pictorial design, I prefer to place a table properly spaced for the record of the different sports. That shown in the drawings will be a record or score-card for a base-ball game. This record can be filled out as the game progresses and the final results can be properly noted. In the case of any other sport the table or score will correspond with the requirements of whatever sport may be represented. Any number of different sports may be represented upon the same calendar, and in this way the same calendar may be arranged to record the dates of all the sports transpiring in any given locality.

I prefer to locate, preferably upon the cardboard which forms the back or support to which the monthly sheets of the calendar are attached, a table or blank-record form having spaces in which the summary of all the games or sports occuring during the year may be recorded, giving names of contestants, the date on which the sport occurs, and the result.

I am aware that it is old to provide a calendar having upon its spaces pictorial representations illustrating the phases of the moon; but my invention differs materially from this, as I employ pictorial representations of persons engaged in some kind of sport. The location of the pictures upon the calendar indicates the days upon which the sport is to occur. These pictures, it will be seen, are all alike for any kind of sport, while in the reference the pictures must necessarily be different from each other, or otherwise they would not indicate the various phases of the moon.

I claim as my invention—

1. A calendar provided with spaces representing the days of the month, with pictures of persons engaged in a sport placed upon the spaces representing the days upon which said sport is to occur, substantially as described, and for the purpose set forth.

2. In a calendar having spaces representing the days of the month, a pictorial representation designating a particular sport placed upon one or more of said spaces, and a record-blank or score-card corresponding with said sport and placed upon the same space with said pictorial representation, substantially as described.

3. In a calendar, in combination with the sheets representing the different months having the days of the months marked thereon, the pictorial representation designating a particular sport placed upon one or more spaces or dates of the said calendar, a record or score card corresponding with said sport placed upon the same space therewith, and a recapitulation sheet or blank for the purpose of recording the results of the different sports, substantially as described.

In testimony whereof I have hereunto set my hand this 27th day of March, 1890.

ARTHUR H. ROBINSON.

In presence of—
R. H. SANFORD,
BESSIE BOOTH.